United States Patent [19]

Mule

[11] 3,882,453

[45] May 6, 1975

[54] VEHICLE MOVEMENT SENSITIVE ALARM

[76] Inventor: Carmela Mule, 249 12th St., Brooklyn, N.Y. 11215

[22] Filed: Sept. 24, 1973

[21] Appl. No.: 400,022

[52] U.S. Cl. ............ 340/65; 307/10 AT; 200/42 R
[51] Int. Cl. .......................................... B60r 25/10
[58] Field of Search...... 340/63, 64, 65; 307/10 AT; 200/42 R, 61.45 R, 61.44, 61.48, 61.52

[56] References Cited
UNITED STATES PATENTS

| 2,947,830 | 8/1960 | Gross | 340/65 X |
|---|---|---|---|
| 3,699,515 | 10/1972 | Barnett | 340/65 |
| 3,715,533 | 2/1973 | Seaton | 340/65 X |

*Primary Examiner*—Alvin H. Waring
*Attorney, Agent, or Firm*—Friedman & Goodman

[57] ABSTRACT

A movement sensitive alarm includes a tamper-proof enclosure. A movement sensitive electrical contact switch, in the form of an elongate vertical conductive cylindrical housing and a freely movable pendular member suspended therein, is provided in the enclosure. The pendular switch forms a series connected element of an alarm circuit which is enabled by means of an on-off switch connected in series with the pendular switch. When used on a bicycle, the enclosure may be pivotally mounted on the axle of one of the bicycle wheels and movable from a position above the wheel when the bicycle is in use to a locked position below the wheel when the bicycle is parked. The enclosure is provided with a planar wall or surface which permits the enclosure to abut against a level portion of ground and adjustment means are provided for leveling the enclosure when not on level ground to position the freely movable pendular member in a non-contacting condition with respect to the conductive cylindrical housing. When the bicycle is tilted or abruptly moved, a closed electrical connection is provided by the pendular member contacting the conductive cylindrical housing to close the alarm circuit. When the bicycle is in use, the planar surface or wall of the enclosure which abuts against the ground when the bicycle is parked serves as a supporting surface above a wheel for supporting books or the like.

10 Claims, 7 Drawing Figures

PATENTED MAY 6 1975　　　　　　　　　　　　3,882,453

VEHICLE MOVEMENT SENSITIVE ALARM

BACKGROUND OF THE INVENTION

This invention generally relates to theft alarms, and more particularly to an alarm which is energized whenever the same is abruptly moved or tilted from a predetermined position.

Numerous alarm systems for detection of theft are known, including alarms for motor vehicles and for bicycles. However, many of the known alarms are complicated in construction and costly to manufacture. Accordingly, many of these alarm systems are not commercially practical.

For example, an anti-theft device is known which utilizes a movement sensing element in the form of a mercury switch which initiates the alarm when the angle of the switch is changed by, for example, moving a bicycle.

An agitation sensitive alarm circuit is also known wherein links of a chain form a switch. With such a switch, the impedance exhibited by the series connected links when randomly placed at rest is very high. The resistance of the series connected links drops to a very low value during periods of agitation. This change in resistance is detected and caused to initiate an alarm signal.

Also commonly known are vibration switches which typically utilize a weight mounted at the end of a resilient but generally straight wire or spring. Movement of the device being protected causes the weight to vibrate to thereby contact a conductive tube or the like.

As suggested above, the hitherto known theft alarm devices, generally high is cost of manufacture, comprise simple alarm circuits wherein one of the switches therein is either in the form of a plurality of links of a chain, a vibratory element or a mercury switch or the like. The known alarms are not, however, equally suitable for both detecting abrupt movements of and/or tilting of the vehicle being protected. Further, the known alarms are mounted on a motor vehicle or a bike frame and merely serve to generate an alarm signal. None of the known bicycle alarms serve a plurality of functions. On the other hand, the present invention firstly comprises an improved alarm device which is sensitive both to abrupt movement and tilting and secondly provides an alarm device which serves both as a bicycle stand and as a book carrying rack.

SUMMARY OF THE INVENTION

Accordingly, it is an object of the present invention to provide an alarm which is not possessed of the disadvantages associated with prior art comparable alarms.

It is another object of the present invention to provide an alarm which is simple in construction and economical to manufacture and which may be initiated both in response to tilting or abrupt movements of a vehicle being protected.

It is still another object of the present invention to provide a bicycle alarm which, in addition to generating an alarm signal, also functions as a bicycle stand in the parked condition of the bicycle and serves as a book carrying rack when the bicycle is in use.

It is yet another object of the present invention to provide a bicycle alarm which can be typically manufactured and forms part of the bicycle frame, whereby removal or tampering with the alarm device without activating the same is prevented.

In order to achieve the above object, as well as others which will become apparent hereafter, the present invention for an alarm comprises a tamper-proof enclosure. Pendulum means is arranged within said enclosure for providing an open electrical connection when said enclosure is stationary and disposed in in a predetermined position and for providing a closed electrical connection when said enclosure is disturbed or moved from said predetermined position. Circuit means are provided which are connected to said pendulum means for generating an alarm signal when said pendulum means exhibits a closed electrical connection. In this manner, an alarm condition is established when said enclosure is moved in any manner to disturb said pendulum means.

Said pendulum means comprises an elongate conductive cylindrical housing mounted in said enclosure to position the same in a substantially vertical position when the enclosure is positioned in a predetermined manner. A conductive elongate pendular member is provided at least partially extending through said conductive housing. Insulating support means are provided at one end of said conductive housing for pivotally supporting said pendular means to permit free movement of the latter. In this manner, connection of said circuit means to said conductive housing and to said pendular member provides an open electrical connection when said pendular member extends through said conductive housing without contacting the latter and provides a closed electrical connection when the enclosure is disturbed or moved and said pendular member contacts said conductive housing.

When used in conjunction with a bicycle, said enclosure is advantageously rotatably mounted on the axle of one of the bicycle wheels for movements below the wheel in the parked condition of the bicycle and above the wheel when the bicycle is in use. The enclosure is elongate and is provided with two substantially opposing surfaces. One of said surfaces is circularly curved to follow the contour of an adjoining bicycle wheel. The other of said opposing surfaces is planar and suitable for abutting against a flat portion of the ground when the bicycle is parked and is suitable for supporting books and the like when the enclosure is in the upper position when the bicycle is in use.

BRIEF DESCRIPTION OF THE DRAWINGS

With the above and additional objects and advantages in view, as will hereinafter appear, this invention comprises the devices, combinations and arrangements of parts hereinafter described and illustrated in the accompanying drawings of a preferred embodiment in which.

DESCRIPTION OF THE PREFERRED EMBODIMENTS

The movement sensitive alarm of the present invention can be used in conjunction with any property which is movable, as will become apparent hereafter. The invention is particularly suitable to protect automobiles and bicycles and the description that follows will be connection with a bicycle alarm. However, this description is merely illustrative and the described alarm can be readily adapted to other applications by those skilled in the art.

Figure 1:
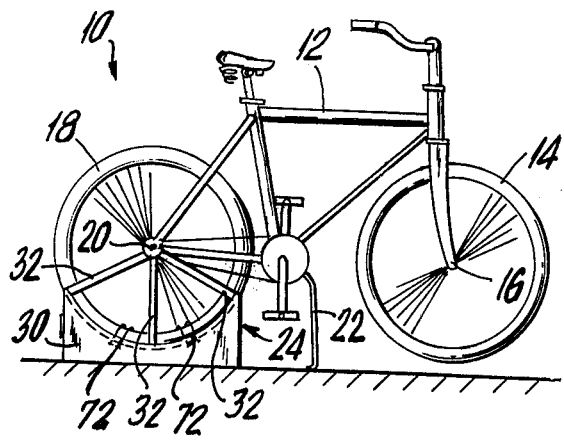
FIG. 1 is a side elevational view of a bicycle in the parked position, shown maintained in that position by a kickstand and the enclosure of the alarm device of the present invention which is disposed below the rear wheel of the bicycle.
Figure 2:
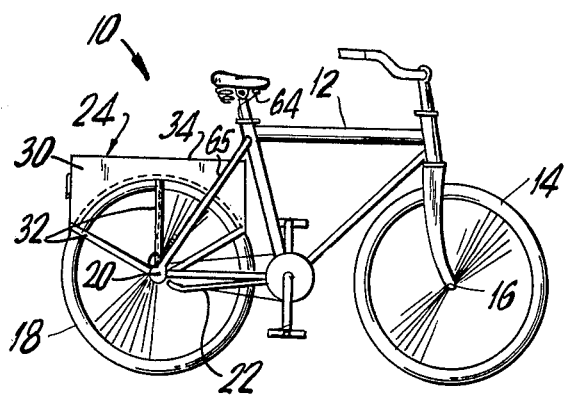
FIG. 2 is a side elevational view of the bicycle shown in FIG. 1, with the alarm device disposed above the rear wheel, in the position thereof during use of the bicycle.

Referring now to the FIGURES, wherein the identical or similar parts are designated by the same reference numerals throughout, and first referring to FIGS. 1 and 2, a bicycle 10 is shown to comprise a frame 12 on which is mounted a front wheel 14 by means of an axle 16 and a rear wheel 18 by means of an axle 20. The bicycle 10 is advantageously provided with a conventional double-kickstand 22 for maintaining the bicycle in the upright position as shown when the bicycle is parked.

The alarm device of the present invention is generally designated by the reference numeral 24. Although the alarm device 24 is described and illustrated as being disposed in the region of the rear wheel 18, it should be clear, as will become apparent hereafter, that the alarm device 24 may equally cooperate with the front wheel 14.

The alarm device 24 includes a tamper-proof enclosure 30 which is connected to the bicycle frame 12 by means of bars or rods 32 which are each connected at one end to the enclosure 30 and at the other end are pivotally mounted on the axle 20. With this arrangement, the enclosure 30 may be moved from a position below the rear wheel 18 when the bicycle is parked to a position above the rear wheel when the bicycle is in use, as shown in FIG. 2. The free rotatability of the enclosure 30 about the axle 20 requires locking means for maintaining the enclosure 30 in the upper position shown in FIG. 2. Any conventional locking means (not shown) may be utilized for this purpose.

Figure 3:
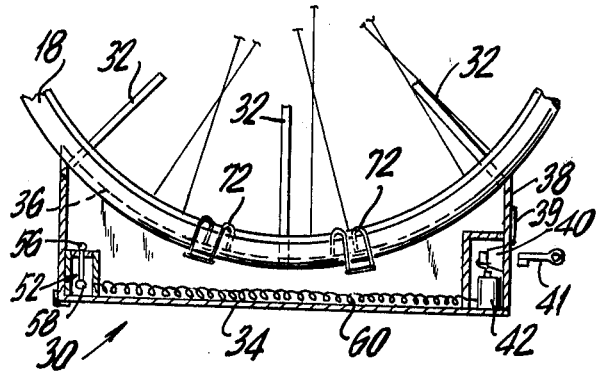
FIG. 3 is an enlarged longitudinal cross section of the alarm device when the latter is in the parked position shown in FIG. 1.
Figure 4:
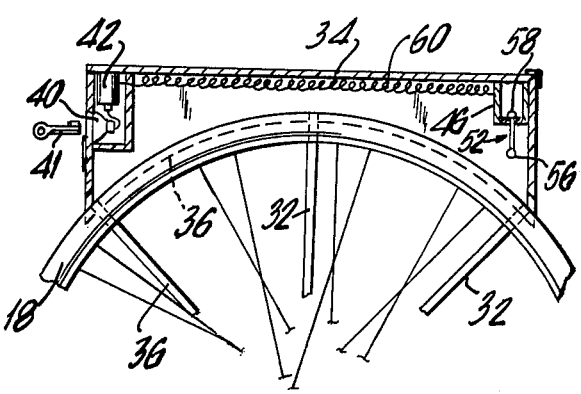
FIG. 4 is an enlarged longitudinal cross section of the alarm device disposed above the rear wheel as shown in FIG. 2.

As best shown in FIGS. 3 and 4, the enclosure 30 is provided with a planar wall or surface 34 and an opposing circularly curved wall or surface 36 which follows the contour of the rear wheel 18. The center of curvature of the curved wall 36 is the same as the center of curvature of the rear wheel 18 to thereby permit the free rotatable movement of the enclosure 30 about the axle 20 without contact between the rear wheel 18 and the enclosure.

The planar wall 34 is suitable for abutting against a flat portion of the ground, as shown in FIG. 1 as well as for forming a flat supporting surface for books or the like, as shown in FIGS. 2 and 4.

Figure 5:
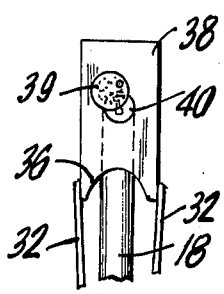
FIG. 5 is a rear elevational view of the alarm device when the latter is disposed above the wheel when the bicycle is in use, as shown in FIGS. 2 and 4.

The wall 34 is in the form of a door which is hingedly connected to provide access to the interior of the otherwise closed enclosure. A lock 40 is provided on an end wall 38 which may be used to lock the door 34 to close the enclosure and to unlock the door 34 to provide access to the enclosure interior. A key 41, for use in conjunction with the lock 40, may be utilized to close the hinged door 34 as well as to activate or enable the alarm circuit to be described. With this arrangement, the door 34 cannot be opened without sounding the alarm when the enclosure 30 is in the lower or parked position of FIG. 3. Alternately, any other wall, such as wall 38, may be hingedly connected to form the access door. A reflector 39 may be provided which covers the lock 40 to conceal the same and to prevent external particles from entering therein. The reflector is resiliently pivotally mounted to expose the lock as shown in FIG. 5.

Figure 6:
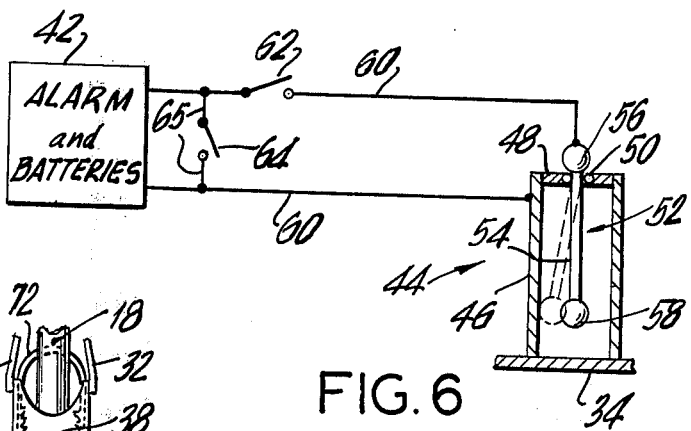
FIG. 6 is a schematic representation of the pendulum of the present invention forming part of the alarm circuit housed in the enclosure shown in FIGS. 1-4.

Referring to FIGS. 3, 4 and 6, the reference numeral 42 generally designates an alarm circuit and batteries for energizing the same. The alarm 42 to be described is of the normally open circuit type or "open-loop" alarm wherein a normally open switch is closed to indicate an alarm condition. However, the normally open switch to be described can equally be utilized with a "closed-loop" alarm with suitable modification of the circuit shown in FIG. 6 as is apparent to those skilled in the art.

The sensing device or normally open switch of the present invention is designated a pendulum and is generally indicated by the reference numeral 44. The pendulum 44 includes an elongate conductive cylindrical housing 46 which is mounted on the planar wall 34 within the enclosure to position the housing in a substantially vertical position when the bicycle is parked and the enclosure 30 abuts against a flat portion of ground. The cross sectional configuration of the housing 46 is not critical for the purpose of the present invention, and any suitable housing cross section may be selected. In the presently preferred emobodiment of the invention, the housing is cylindrical or provided with a circular cross section. Such a housing provides equal responsiveness to movement of the bicycle in any direction thereof, as will become apparent hereafter.

One open end of the housing 46 is fixed to the planar wall 34 in any conventional manner.

The other or upper end of the housing 46, as shown in FIG. 6, is closed by an apertured insulating disc 48. Advantageously, frictional reducing means, such as a bearing 50, is provided at the aperture of the disc 48 for reasons to be described hereafter.

A conductive elongate pendular member 52 comprises an elongate rod 54 of substantially uniform cross-section. The rod 54 is provided with enlargements 56, 58 at the ends thereof. The rod 54 extends through the aperture of the disc 48 or through the bearing 50. The enlargements are dimensioned to prevent the same from passing through the aperture or through the bearing. In this manner, the pendular member 52 may be suspended by one of the enlargements 56, 58 from the insulating disc 48 to permit pendular movement of the rod 54.

When the bicycle is in the parked position, shown in FIGS. 3 and 6, the rod 54 substantially extends through the cylindrical housing 46 and is suspended therein by the enlargement 56. In this state of suspension, the pendular member 52 may freely move as suggested by the dashed outline thereof. The pendular member 52 and the cylindrical housing 46 exhibits an open circuit therebetween as long as the enlargement 58 is spaced from the cylindrical housing wall. Movement of the cylindrical housing, which results from any disturbance or movement of the bicycle, causes the enlargement 58 to contact the cylindrical housing 46 and a short circuit is exhibited by these two members of the pendulum 44. In this manner, the pendulum 44 behaves as a normally open switch which is closable by the contact of the pendular member 52 with the housing 46.

The bearing 50 is advantageously provided to minimize friction at the suspended end of the pendular member 52 to thereby facilitate the free movement of the pendular member.

The alarm device 42, which includes conventional alarm circuitry, is connected to the pendulum 44 by means of conductors 60, one conductor being connected to the pendulum member 52 and the other member is connected to the cylindrical housing 46. A series connected switch 62 is provided which disables the alarm 24 when opened. The switch 62 may form part of the lock 40 so that closing the lock 40 simultaneously closes the switch 62. Alternately, the switch 62 can be provided interiorly of the enclosure 30. With this arrangement, the switch 62 can be closed when the hinged door 38 is opened, the door subsequently being locked to prevent unauthorized opening of the switch 62.

The alarm circuitry 42 of the presently preferred embodiment is of the latching type so that contact between the pendular member 52 and the conductive cylindrical housing 46, with the switch 62 closed, energizes the alarm device 42 and latches the same into a continued state of energization irrespective of subsequent opening of the pendulum switch 44. In this manner, even a temporary contact within the pendulum 44 is sufficient to set off the alarm and maintain the same in an alarm signal generating mode.

A switch 64 may be provided which serves as a panic button for initiating the generation of an alarm signal irrespective or independently of the pendulum 44 or the condition of the switch 62. The panic button switch 64 is connected in parallel with the series connection of the switch 62 and the pendulum 44 by means of wires 65 and a temporary closing of the switch 64 simulates a contact between the pendular member 52 and the housing 46 to initiate the alarm circuit 42. The panic switch 64 may be provided on the handle bars of the bicycle. However, the switch 62 may be mounted at any other convenient or desirable location. For example, the switch 62 may be concealed, such as under the seat of the bicycle as shown in FIG. 2, to prevent inadvertent depression thereof by children or the driver of the bicycle. Since the alarm circuit 42 is of the latching type, even a temporary depression of the panic switch 64, as with the momentary contact within the pendulum 44, latches the relay and maintains the same on until turned off with the lock or concealed switch 62 or until the battery is fully discharged.

The pendular member 52, as described above, is freely movable within the housing 46. For this reason, the pendulum 44 provides the requisite closed electrical connection either when the bicycle is jarred or when the same is slowly and carefully moved from its parked condition. Herein lies an important advantage of the present invention as distinguished from the vibratory switches known in the prior art. The prior art switches typically require an abrupt movement of the bicycle to impart a vibratory motion to a weighted spring type element. However, gradual or slow movement of the bicycle could result in a no-alarm condition despite the tilting of the bicycle from its normal upright parked position. On the other hand, the pendulum 44, with its freely swinging pendulum member 52, provides a closed electrical connection necessary for an alarm condition either when the bicycle is jarred or abruptly moved or when the bicycle is tilted or is caused to depart from its stationary parked position. The degree of movement or tilting of the bicycle to set off the alarm can be controlled by selecting an appropriate cylindrical housing 46 diameter as well as size of the enlargement 58. Clearly, the smaller the diameter of the cylindrical housing 46 or the larger the size of the enlargement 58, the less movement or tilting of the bicycle will be necessary to effect a contact therebetween.

It should be clear from the above that the pendulum 44 can be utilized to sense unauthorized movements of the bicycle either in the upper or in the lower positions of the enclosure 30. In a modified arrangement, wherein the pendulum 44 is utilized to sense alarm conditions while the enclosure 30 is above the rear wheel 18, the cylindrical housing 46 may be mounted on one of the vertical walls of the enclosure to always maintain the pendular member 52 suspended by the enlargement 56 as described above. However, in the presently preferred embodiment, wherein the enclosure 30 is rotatable between the upper and lower positions, the pendular member 52 is permitted to slide through the bearing 50 to cause the pendular member to be suspended by one or the other of the enlargements. For example, when the bicycle is in the parked condition, the pendular member 52 is suspended by means of the enlargement 56 as shown in FIGS. 3 and 6. The operation of the pendulum in this condition is described above. However, when the enclosure 30 is rotated to its upper position, the pendular member 52 slides through the bearing 50 to thereby be suspended by the enlargement 58, as shown in FIG. 4. In this position of the pendular member 52, when the bicycle is in use, the pendulum 44 cannot activate the alarm device 42 since the pendular member 52 is substantially withdrawn from the housing 46. However, the alarm may still be initiated by the depression or closing of the panic switch 64. The rotatable arrangement of the enclosure 30 is presently preferred because, in the parked position, movement of the bicycle is hampered and riding the bicycle, even with the alarm energized, is prevented when the enclosure 30 is disposed in the lower position below the rear wheel 18.

Figure 7:
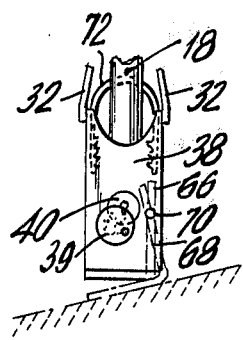
FIG. 7 is a rear elevational view similar to FIG. 5, but with the alarm device disposed below the wheel in its parked condition of the bicycle, and further showing adjustment means for compensating for non-level ground or terrain on which the bicycle is parked.

Referring to FIG. 7, adjustment means in the form of a slot 66 and a right angle bracket 68 is provided on the enclosure 30 for compensating against unlevel ground conditions. The right angle bracket has a portion of one leg thereof connected to the wall or door 38 by means of an adjusting or tightening know 70. When the knob 70 is loosened, the bracket may generally be rotated about the axis of the knob 70 and may also be slidingly moved along the direction of the slot 66. In this manner, when the ground is not level, the bracket 68 can be disposed to support the bicycle and maintain the same in a generally upright position necessary to provide an open electrical connection within the pendulum 44.

Referring to FIGS. 1 and 3, clamps 72 may be provided which pass through the spokes of the rear wheel 18 and are locked into place with respect to the enclosure 30 in any conventional manner to both prevent rotation of the rear wheel 18 and to prevent the separation of the enclosure 30 from the bicycle. The clamps 72 may be snapped onto the rear wheel into engagement with the enclosure 30, as suggested in FIG. 3, for preventing an unauthorized person from moving the enclosure to the upper position shown in FIG. 4 and driving away with the bicycle while the alarm is in the energized condition. In this manner, the bicycle cannot be ridden away but must be carried away while the alarm is generally an audible alarm signal.

To prevent an unauthorized person from severing the rods 32 and thereby remove the bicycle without the movement of the enclosure 30, and thereby the energization of the alarm, a continuous wire, forming part of a "closed loop" electrical alarm system, may extend through a pair of the rods or bars 32. The conductor or wire which extends through the two rods 32 are connected at the free ends thereof to a "closed loop" alarm system. With this arrangement, an attempt to cut the rods 32 will sever the conductor passing therethrough and thereby open the closed loop to set off an electrical alarm. The closed loop system used in conjunction with the rods 32 can be combined or integrated with the open loop system of the pendulum 44 shown in FIG. 6, as well known to those skilled in the art. For example, the pendulum 44 can, by means of a relay having normally closed contacts, be placed in series with the closed loop system. Alternately, the closed loop system used in conjunction with the rod 32 may include a relay having normally open contacts which are placed in parallel with the normally open circuit of the pendulum 44.

While the above described alarm has been in conjunction with the protection of a bicycle, it should be clear that the pendulum alarm shown in FIG. 6 can be utilized to protect other devices such as automobiles or any objects which can be moved for removal thereof. The diameter of the cylindrical housing 46 may be varied to accommodate the particular use intended. Thus, for an automobile, the cylindrical housing 46 may be increased to prevent undesired false alarms by, for example, a person from sitting or leaning on the car and inadvertently tilting the same to cause a contact within the pendulum 44. On the other hand, the diameter should be selected sufficiently small to assure contact on acceleration or stopping of the vehicle under normal driving conditions. In the case of an automobile, the switch 62 or another normally open switch connected in series therewith may advantageously be disposed below the driver's seat to thereby be closed when a driver sits on the seat. In this manner, the alarm system is enabled or is permitted to be energized only when a person sits in the driver's seat. With this arrangement, a person sitting or leaning on the car cannot inadvertently trip the alarm since the switch 62 would remain off so long as no one is sitting in the driver's seat.

What has been described above, is a simple alarm system which may be utilized to protect bicycles, automobiles or the like. In the case of bicycles, the alarm is sounded either when the bicycle is abruptly moved or is tilted to any appreciable degree — a certainty when the bicycle is carried away by an unauthorized person without turning the alarm off. The swinging or rotating movement permitted for the enclosure 30 permits the same to be clamped below a wheel of the bicycle, this hampering movement of the bicycle and forcing the bicycle to be carried away with certain attendant energization of the alarm.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. An alarm in combination with a bicycle comprising a tamper-proof enclosure, said enclosure being elongate and provided with two substantially opposing surfaces, one of said surfaces being circularly curved to follow the contour of an adjoining bicycle wheel and the other of said opposing surfaces being planar and suitable for abutting against a flat portion of the ground when the bicycle is parked and said enclosure is disposed below the wheel, pendulum means including a freely movable pendular member arranged within said enclosure for providing an open electrical connection when said enclosure is stationary and disposed in a predetermined position and for providing a closed electrical connection when said enclosure is disturbed or moved from said predetermined position; and circuit means connected to said pendulum means for generating an alarm signal when said pendulum means exhibits a closed electrical connection, whereby an alarm condition is established when said enclosure is moved in any manner to disturb said pendulum means.

2. An alarm as defined in claim 1, wherein said enclosure includes a hingedly connected wall forming a door to provide access to the interior of said enclosure; and locking means for locking said door to close said enclosure and for unlocking said door to provide access to said enclosure interior.

3. An alarm as defined in claim 1, wherein said enclosure is pivotally mounted about the axle of a wheel of the bicycle, whereby said planar surface is movable from a downwardly facing position below the wheel when the bicycle is parked to an upwardly facing position above the wheel when the bicycle is in use.

4. An alarm as defined in claim 3, further comprising clamp means adapted to pass through the spokes of the wheel and releasably engageable with said enclosure in locking relation thereto for locking said enclosure below the wheel when the bicycle is parked, whereby said enclosure is prevented from being moved to the position above the wheel for the purpose of unauthorized riding of the bicycle.

5. An alarm as defined in claim 1, wherein said pendulum means comprises an elongate conductive cylindrical housing being mounted in said enclosure to position the same in a substantially vertical position when said enclosure is in said predetermined position, said member being elongate and conductive and at least partially extending through said conductive housing; and insulating support means provided at one end of said conductive housing for pivotally supporting said pendular member, whereby connection of said circuit means to said conductive housing and to said pendular member provides an open electrical connection when said pendular means extends through said conductive housing without contacting the latter and provides a closed electrical connection when said enclosure is disturbed or moved and said pendular member contacts said conductive housing.

6. An alarm as defined in claim 5, further comprising bearing means on said insulating support means for supporting said pendular member with minimal friction during free pendular movements thereof within said conductive housing.

7. An alarm as defined in claim 5, wherein said pendular member comprises an elongate rod of substantially uniform cross section, said rod being provided with an enlargement at each end thereof, said insulating support means comprising an apertured disc fixed transversely at one end of said conductive housing, said rod extending through the aperture in said disc, and said enlargements being dimensioned to prevent the latter from passage through said aperture, whereby suspension of said rod by one of said enlargements from said disc permits pendular movements of said rod.

8. An alarm as defined in claim 1, further comprising adjustment means on said enclosure for leveling said pendulum means to provide an open electrical connection when the bicycle is parked on non-level ground portion.

9. An alarm as defined in claim 1, wherein said circuit means includes latching means for continuing generation of an alarm signal when an enclosed electrical connection is exhibited by said pendulum means; and reset means for deenergizing said circuit means.

10. A bicycle alarm as defined in claim 1, further comprising manual switch means provided in parallel connection to said pendulum means for initiating said alarm signal generation independently of said pendulum means.

* * * * *